United States Patent Office 2,708,178
Patented May 10, 1955

2,708,178

TESTING PROCEDURE

Paul György, Villanova, Pa., assignor to American Home Products Corporation, New York, N. Y., a corporation of Delaware No Drawing. Application October 9, 1953,
Serial No. 385,275

4 Claims. (Cl. 195—103.5)

This application is a continuation-in-part of my co-pending patent application, Ser. No. 276,435, filed March 13, 1952, now abandoned.

This invention relates to a procedure by which it is possible to determine whether a substance contains a specific growth-promoting factor for the microorganism Lactobacillus bifidus, or whether it is lacking in this important biological principle. Moreover, the procedure gives an approximate numerical value for the relative content of the growth-promoting factor in the substance undergoing test, where that factor is present therein in appreciable amount.

The procedure is of value in ascertaining whether a particular substance, which may be a foodstuff, a biologically-produced waste product, a naturally occurring product, or any other material, constitutes such a potent source of the growth-promoting factor as to justify the extraction and recovery of this biologically active principle therefrom. It is also of value for various other purposes and for nutritional studies generally.

The specific growth-promoting factor for Lactobacillus bifidus, extracted or otherwise recovered in purified form from a suitable source material, can of course be incorporated in a foodstuff which is normally deficient in this growth-promoting factor, thereby rendering the resulting foodstuff of considerable value for nutritional purposes. The possibility of locating suitable source materials from which the specific Lactobacillus bifidus growth-promoting factor can be recovered, so that this growth-promoting factor may then be used to supplement small amounts of the growth-promoting factor already present in a foodstuff, or to raise the level of growth-promoting factor therein so that a nutritionally adequate foodstuff is secured, is of considerable importance in the feeding of infants and for scientific studies generally.

The specific growth-promoting factor for Lactobacillus bifidus, and its importance in infant nutrition, can be best explained with reference to the growth and proliferation of the Lactobacillus bifidus microorganism in the intestinal tract of the young child, particularly in the intestinal tract of those infants who are fed exclusively with human or breast milk.

Lactobacillus bifidus constitutes the predominant microorganism of the flora present in the stools of breast-fed infants. As grown in colonies in the intestinal tract of infants nursed with human (breast) milk, the organism is gram-positive. Morphologicaly it comprises straight or curved rods which are non-motile and which do not form spores. One end of the rod may be bulbous or racket-shaped, and one or both ends may appear to be split longitudinally to give the effect of two short branches. Lateral branches of relatively short length may also be present. This appearance of the microorganism as it propagates has led to its characterization as "bifid."

The L. bifidus microorganism grows in cultures under anaerobic or microaerophilic conditions, which are herein defined as those in which the oxygen content is less than from 2 to 4%. It will continue to grow for an indefinite period in numerous sub-cultures provided the necessary microaerophilic conditions are strictly maintained.

By the third or fourth day after birth, the intestinal flora of the breast-fed infant is characterized by the presence of Lactobacillus bifidus as the predominating microorganism. In the stools of breast-fed infants practically the entire flora is made up of this organism.

The predominance of this microorganism in the intestinal tract and feces is characteristic only of those infants who are fed human (breast) milk. Infants who are fed with the milk of other animals, such as cows' milk, or with preparations in which cows' milk is an important constituent, do not show this predominance of L. bifidus, the microorganism content of their feces comprising a less uniform flora with an appreciable proportion of gram-negative rods and cocci.

The fact that a stable L. bifidus flora is characteristic only of the intestinal tract of breast-fed infants is now fully understood and appreciated by pediatricians and other specialists in the medical, biological, and nutritional sciences. See, for example, the publications of Tissier; Comptes rendus soc. biol., 51, pages 943–945; and 60, pages 359–361; and Ann. inst. Pasteur, 19, pages 109–123; and 22, pages 189–207. See also the papers of Moro; Wien. klin, Wochschr.; 13, pages 114–115, and Jahrd. Kinderheilk., 61, pages 687–734; and 61, pages 870–899. That the original observations of Tissier concerning the predominance of L. bifidus in nursling's stools have been amply confirmed is pointed out in the more recent publication of Norris, Flanders, Tomarelli and György in the Journal of Bacteriology, 60, pages 681–696 (December 1950).

Medical authorities are now in general agreement that many of the advantages which a breast-fed infant seems to have, insofar as its nutrition and resistance to certain diseases are concerned, are attributable, at least in part, to the predominance in the intestines of L. bifidus. The predominance of this organism is now believed to be of physiological significance, and its growth may prevent intestinal disorders caused by other bacteria. Resistance to bacterial intestinal diseases, and even to parenteral disorders, such as respiratory infections, is typical of breast-fed infants, infants who are bottle-fed with the milk of cows and other animals being markedly more susceptible to such disorders. In this connection see the article of Robinson, Lancet, "Infant Morbidity and Mortality," vol. CCLX, page 788 (April 7, 1951).

In the infant colon in which a stable L. bifidus flora is lacking, it is now generally believed that the infant is more likely to suffer from disorders attributable to the growth of other bacteria, some of which are harmful to the infant, since competition for the available food supply in the infant intestinal tract where L. bifidus flourish reduces the possibility that other bacteria, particularly the harmful B. coli, may grow in considerable numbers or in extensive colonies. In any event, where the gram-positive bacillus L. bifidus is present in large numbers in the infant intestine, which occurs only when the infant is breast-fed, there is considerably less growth of other microorganisms, particularly the gram-negative B. coli, Clostridia, and air-borne microorganisms, such as the Sarcinae bacteria. While the reasons for the superior resistance to disease of breast-fed infants, as compared with infants who are fed on cows' milk, or on the usual infant formulas in which cows' milk is a principal constituent, are not fully understood, pediatricians are generally agreed, however, that in some measure at least the superior resistance is attributable to the growth of an extensive L. bifidus flora in the intestines of nurslings, this bacterium being absent in any appreciable numbers from the intestines of all infants except those who are nursed with human milk. Interest in the isolation and determination of the growth requirements of L. bifidus has therefore been stimulated by its apparently unique predominance in the intestinal tract of the breast-fed infant.

For some time research has been carried out in an effort to isolate and identify the active biological factor which is responsible for promoting the growth of some strains of the microorganism, Lactobacillus bifidus. In the co-pending patent application of György, Kuhn and Zilliken, Ser. No. 283,006, filed April 18, 1952, the isolation and recovery of this growth-promoting factor from human milk is described and claimed.

By a process which involves defatting human milk, removing substantially all protein therefrom, removing inorganic and mineral substances then remaining in the human milk fraction, and finally by adsorbing the active growth-promoting factor or principle on a solid adsorbent and eluting it therefrom by means of suitable eluants, the new growth-promoting factor for Lactobacillus bifidus was recovered from breast milk.

As recovered in the form of a dry powder, and as described in said patent application, the new biologically-active material is identified as being non-protein in character. It is free from amino acids, peptides and proteins. It does not give a positive test with ninhydrin, but after acid hydrolysis the ninhydrin test becomes positive, due to the formation of d-glucosamine.

Chemically the new Lactobacillus bifidus growth-promoting factor is characterized as comprising substances of the group of N-glycosides containing N-acetyl-hexosamines in glycosidic linkage. Upon hydrolysis under acid conditions it is converted to hexosamines, as determined colorimetrically by the Morgan-Elson test.

The new growth-promoting factor contains the chemical elements nitrogen, hydrogen, carbon and oxygen, but it does not contain either sulfur or phosphorus. Its nitrogen content is relatively low, falling within the range 1.7% to 2.0%. It is adsorbed on adsorbent agents such as carbon, charcoal, cellulosic products such as filter paper, adsorbing resins, and cellulosic powders, being, however, most typically and most easily adsorbed on the carbonaceous adsorbents. It is extremely resistant to high temperatures, and will withstand temperatures well over 100° C., as, for example, when it is sterilized by heating under pressure in aqueous solutions at a temperature of 120° C. for 15 minutes or longer. The growth-promoting factor of human milk is present in a large proportion in dialyzable form; (see the article by György in Pediatrics, vol. 11, No. 2, pages 98, 102; February 1953). In addition to the dialyzable fraction, a varying portion of the growth factor is present in a non-dialyzable form. The latter may be precipitated by ethanol at a concentration between 60–80%.

The infrared absorption spectrum of a mineral oil mull of the Lactobacillus bifidus growth-promoting factor exhibits characteristic maxima at approximately the following wave lengths: 3700, 3000, 2360, 1820, 1600, 1500, 1410, 1190, 920, 830, 800, and 740 cm.$^{-1}$. Of these, the maxima at 1820, 1410, 910, 830, 800 and 740 cm.$^{-1}$ are broad maxima. The maxima at 3700, 3000, 1600, and 1500 cm.$^{-1}$ are relatively sharper peaks.

As recovered from breast milk, the Lactobacillus bifidus growth-promoting factor is found to have an activity for promoting the growth of strains of the Lactobacillus bifidus microorganism, typically the L. bifidus var. Penn strain, which is more than ten times that of the human milk fraction initially subjected to adsorption in the process by which the factor is recovered from human milk. Hereinafter, whenever the Lactobacillus bifidus growth-promoting factor is referred to, this material is the biologically-active substance intended.

The desirability of having available a more convenient source of the growth-promoting factor than human milk has been apparent for some time. For example, if the specific L. bifidus growth-promoting factor were found to be present in appreciable amounts in some readily available commercial product, it could be recovered in a purified form from that product. The biologically-active substance could then be added to cow's milk, or to commercial infant food preparations based on cow's milk, for example, thus securing foodstuffs supplemented by the growth-promoting factor which would possess the nutritional advantages of human milk. A flora similar to that in the intestinal tracts of breast-fed infants would result when the cow's milk or infant food composition, supplemented by the addition of the biologically active principle, was ingested by an infant. As a matter of fact, if a suitable source of the Lactobacillus bifidus growth-promoting factor could be found elsewhere than in human milk, it might even be unnecessary to recover it in substantially pure form, as a more or less impure concentrate containing the biological growth factor might be added to the foodstuff which is to be enriched or supplemented.

This search for a source of the specific L. bifidus growth-promoting factor in readily available commercial products has been seriously handicapped, however, by the lack of any test responsive to the growth-promoting factor which could be used to determine, by a rapid and simple procedure, whether a material under test contained the growth-promoting factor, or did not contain that factor. The determination has been further complicated by the fact that some strains of the Lactobacillus bifidus microorganism seem to grow satisfactorily even in mediums which do not contain breast milk. This lack of a suitable test, and the apparently inconsistent behavior of at least some strains of the Lactobacillus bifidus microorganism under certain circumstances, have greatly handicapped the search for source materials containing this important biological principle.

It has now been found that it is possible to separate from the feces of breast-fed infants various strains of the L. bifidus microorganism which have hitherto not been able to propagate except when grown on mediums containing human milk. These strains, which I have successfully isolated and characterized serologically, in addition to their biochemical behavior, to an extent sufficient to permit their recognition and use for test purposes, therefore provide an important microorganism which may be usefully employed as a tool in the search for substances containing appreciable amounts of this specific growth-promoting factor. Such strains have been referred to in the scientific literature, one of them in particular having been originally designated as Strain No. 212A (now renamed as the var. Penn strain).

In view of the importance of the Lactobacillus bifidus var. Penn strain as recovered from the feces of breast-fed infants and characterized serologically in nutrition, and especially in infant nutrition, considerable research work has been carried out with this special strain. The fact that it needs human milk (or the growth factor present in human milk) for its propagation and growth, and shows no growth in usual mediums satisfactory for most strains of L. bifidus, was recognized by me, and this characteristic of the var. Penn strain (previously identified as Strain No. 212A) (ATTC No. 11,863) has been discussed in a paper published in "Pediatrics," vol. 11 No. 2 (February 1953), pages 98 to 108, the paper being entitled "A hitherto unrecognized biochemical difference between human milk and cow's milk." This strain of the microorganism is also referred to (under the designation No. 212A) in an article by Williams, Norris, and György, which is published under the title: "Antigenic and cultural relationships of Lactobacillus bifidus and Lactobacillus parabifidus" in the March-April 1953 issue of the Journal of Infectious Diseases, vol. 92, pp. 121–131. It is pointed out in that article that this specific strain will not grow in the chemically defined medium of Norris et al. (Jour. of Bacteriology; 60: pp. 681–696), unless breast milk is added as a supplement to this medium. The growth requirements of this variant of the *Lactobacillus bifidus* microorganism, with special reference to the fact that var. Penn will grow in the regular medium for *Lactobacillus bifidus* only after human milk has been added thereto, are further discussed in a paper by György, Norris and Rose entitled: "Bifidus factor; I. A variant of *Lactobacillus bifidus* requiring a special growth factor," which is shortly to be published in the scientific journal, Archives of Biochemistry and Biophysics.

This variant of the *L. bifidus* microorganism, which showed scant or undetectable growth in the usual medium, i. e. that of Norris et al., and which requires human milk, or the active *L. bifidus* growth-promoting factor contained therein, for its growth, does not differ morphologically from regular strains of the microorganism. Thus, *Lactobacillus bifidus* var. Penn is microaerophilic and gram positive, showing typical branching. Serologically, however, it appears to contain a distinct antigenic component, different from that found in other strains of *L. bifidus*. Moreover, the new strain is characterized by distinct liability, sometimes showing a tendency towards the formation of very mucoid colonies on plates and greatly increased viscosity in liquid mediums. Such mucoid colonies retain, in repeated transfer, their mucoid character, and no reversion to the original non-mucoid strain has been observed. These mucoid colonies, however, still require the presence of human milk (or the growth-promoting factor contained therein) for their growth.

Regular strains of *Lactobacillus bifidus* may utilize maltose interchangeable with lactose. In contrast thereto, *L. bifidus* var. Penn, in addition to the growth factor, requires lactose as its source of carbohydrate. It will show only very scant growth in the presence of maltose. Except as to its requirement for lactose and for the special growth factor present in human milk in order that appreciable growth may occur, differences in the metabolic pattern of *L. bifidus* var. Penn from that of regular bifid strains of the *Lactobacillus bifidus* microorganism have not been observed.

In carrying out my improved testing procedure by which it is possible to determine whether a substance undergoing test contains the specific growth-promoting factor for *L. bifidus*, I utilize the *Lactobacillus bifidus* var. Penn strain of the microorganism. This is capable of being grown under microaerophilic conditions. I utilize as the nutrient medium one which is nutritionally adequate, except for the specific *L. bifidus* growth-promoting factor. This culture medium, as subsequently described herein, contains various nutrients. As used herein, the term "nutrient" includes all substances supplying one or more materials capable of being utilized by the growing microorganism, which may be carbohydrates, amino acids, proteins, hydrolyzed proteins, minerals, vitamins, vitamine precursors, sugars, inorganic foodstuffs, etc.

One such culture medium, nutritionally adequate for all nutritional requirements of the *L. bifidus* var. Penn microorganism, but lacking in the specific *L. bifidus* growth-promoting factor, may contain a sugar, a hydrolyzed protein, various amino acids, various vitamins, and various inorganic constituents. One particular semi-synthetic aqueous medium of this type, having a pH of approximately 6.8, contains substantially the following constituents in the amounts specified per liter of medium for the single strength solution:

Table I

| | |
|---|---|
| Casein hydrolysate (casein hydrolyzed by enzymatic action) | 5 grams. |
| Lactose | 35 grams. |
| Sodium acetate (anhydrous) | 25 grams. |
| Dipotassium phosphate, $K_2HPO_4$ | 5 grams. |
| Alanine, cystine, tryptophane | Each 200 milligrams. |
| Asparagine | 100 milligrams. |

Table 1—Continued

| | |
|---|---|
| Adenine, guanine, xanthine, uracil | Each 10 milligrams. |
| Minerals: | |
| Magnesium sulfate, $MgSO_4 \cdot 7H_2O$ | 200 milligrams. |
| Ferrous sulfate, $FeSO_4 \cdot 7H_2O$ | 10 milligrams. |
| Sodium chloride, NaCl | 10 milligrams. |
| Manganese sulfate, $MnSO_4 \cdot 2H_2O$ | 7 milligrams. |
| Vitamins: | |
| Thiamine (hydrochloride) | 200 micrograms. |
| Riboflavin | 200 micrograms. |
| Calcium pantothenate | 400 micrograms. |
| Pyridoxine (hydrochloride) | 1200 micrograms. |
| Nicotinic acid | 600 micrograms. |
| Para-aminobenzoic acid | 10 micrograms. |
| Folic acid | 10 micrograms. |
| Biotin | 4 micrograms. |
| Ascorbic acid (added after autoclaving) | 1 gram. |

The enzyme-hydrolyzed casein utilized may be any commercially available product, and I have obtained very satisfactory results with the product sold by Sheffield Farms Company under the name "N-Z-Case."

While many of the known variants or mutants of *Lactobacillus bifidus* will grow in the semi-synthetic medium described under anaerobic or microaerophilic conditions, there are certain strains, which, as stated above, I have characterized both serologically and by their biochemical behavior, which will not grow at all, or will grow only to an extremely slight extent, on this culture medium. Among such strains is the *Lactobacillus bifidus* var. Penn strain, as described in the cited literature references. This discovery therefore provides a basis by which the var. Penn strain of the *L. bifidus* microorganism may be employed as a means of testing a substance to determine whether or not it contains appreciable amounts of the specific *L. bifidus* growth-promoting factor.

In this connection it is possible, of course, to utilize as a control a medium such as that set forth above containing, however, added human or breast milk, since breast milk is known to be a very potent source of the specific *L. bifidus* growth-promoting factor.

In carrying out the testing procedure, a small amount, say 5 milliliters or less, of the substance undergoing test is added to a liter of the above-described semi-synthetic medium for *Lactobacillus bifidus*. Portions of the medium are then plated out, inoculated with a strain of the *L. bifidus* var. Penn microorganism by transference from an agar slant or otherwise, and incubated under microaerophilic conditions at a suitable temperature. If growth of the microorganism on the semi-synthetic medium containing the added substance is not observed, then that added substance does not contain the growth-promoting factor for *L. bifidus*. On the other hand, if growth of the *L. bifidus* var. Penn strain occurs to a considerable extent on the medium containing the added substance, and if numerous colonies of the bacillus develop, then this is a clear indication that the substance undergoing test contains considerable amounts of the specific *Lactobacillus bifidus* growth-promoting factor, and that it might therefore be selected as a suitable source material from which to recover this growth-promoting factor in highly purified form so that it might be added, as desired, to other foods which are normally deficient in this growth-promoting factor. The amount of acidity developed during the propagation of the microorganism is an index as to the extent of growth.

When growth occurs, its extent can be measured and compared with the growth of the *L. bifidus* var. Penn strain of the microorganism resulting when the added substance in the test medium is human milk. This comparison therefore provides a convenient quasi-quantitative basis for estimating the amount of the specific *L. bifidus* growth-promoting factor in the substance undergoing test, in those instances wherein positive results are secured.

In actual laboratory operations this testing procedure, as described, may be carried out as follows. Generally I prefer to start with a "double strength" liquid culture medium containing amounts of the specified constituents, per liter of medium, which are twice those specified in the above table for the "single strength" solution. Upon dilution with an equal volume of water during the test and prior to inoculation, the concentration of the medium's constituents, per liter of culture medium, is reduced to the values specified in the table. Actual propagation of the microorganism therefore occurs in a medium having the concentrations noted, although it is more convenient to start with the double strength solution.

An amount of 5 milliliters of the double strength culture medium is introduced into test tubes. Solutions of the substance to be tested to determine whether it is, or is not, a source of the *Lactobacillus bifidus* growth-promoting factor are added, usually in amounts which are in geometric progression, i. e. 1:3:9, in triplicate to the test tubes, not more than 5 milliliters being added to each tube. Finally, the volume in each test tube is brought up to 10 milliliters by the addition of water, which brings the original double strength of the medium down to single strength.

In addition to the substances undergoing test, there are employed in each experiment, as a standard of reference, a series of tubes containing various dilutions of human milk or other standardized source material for the *Lactobacillus bifidus* growth-promoting factor. There are also utilized three tubes which do not contain any added supplementary material, these tubes containing only the standard basic medium whose composition has been given in Table I above.

All tubes, and their contents, are then sterilized by autoclaving, i. e. by heating under pressure at a temperature of 120° C. for about fifteen minutes. After sterilization, all tubes are inoculated, each with a small inoculum of a culture of the microorganism *Lactobacillus bifidus* var. Penn which is 48 hours old. After inoculation all test tubes are incubated for a period of 40 hours. At the end of this period the acid production in each of the tubes is determined by electrometric titration, using glass-electrode on 0.1 N sodium hydroxide solution. The extent of acid production is considered to be an index as to the extent of microbial growth, since the microorganism develops acid in proportion to the amount of growth.

As an example of such a test, the following titration values were obtained for the acidity developed by the microorganism due to growth, after incubation for 40 hours, the particular supplement of the material undergoing test added, per 10 milliliters of medium, being noted for each instance.

*Table A.—Cow's Milk*

| Supplement | Milliliters of N/10 NaOH Solution Needed to Neutralize Acidity Developed |
|---|---|
| None | 0.4 |
| Human milk (skimmed): | |
| 0.02 milliliter | 2.2 |
| 0.06 milliliter | 7.9 |
| 0.2 milliliter | 12.5 |
| Cow's milk (skimmed): | |
| 0.1 milliliter | 0.6 |
| 0.3 milliliter | 0.8 |
| 1.0 milliliter | 2.3 |

These titration values show that human milk is approximately forty times as active in its *L. bifidus* growth-promoting factor content as an equal volume of cow's milk.

Other typical results secured by the use of the test procedure described, on tomato juice, hog gastric mucin, the chemical compound N-acetyl-d-glucosamine, yeast extract and ovomucin, are given in the following tabular summaries.

*Table B.—Tomato Juice*

| Supplement | Milliliters of N/10 NaOH Solution Needed to Neutralize Acidity Developed |
|---|---|
| None | 1.0 |
| Human milk (skimmed): | |
| 0.02 milliliter | 3.4 |
| 0.2 milliliter | 12.6 |
| Tomato Juice: | |
| 0.2 milliliter | 1.0 |
| 1.0 milliliter | 1.3 |

*Table C.—Hog gastric mucin*
(Wilson Packing Company)

| Supplement | Milliliters of N/10 NaOH Solution Needed to Neutralize Acidity Developed |
|---|---|
| None | 0.9 |
| Human Milk (skimmed): | |
| 0.02 milliliter | 3.6 |
| 0.06 milliliter | 10.6 |
| 0.2 milliliter | 14.4 |
| Hog Gastric Mucin: | |
| 0.2 milligram | 5.1 |
| 0.6 milligram | 10.8 |
| 2.0 milligram | 13.4 |

*Table D.—N-acetyl-d-glucosamine*

| Supplement | Milliliters of N/10 NaOH Solution Needed to Neutralize Acidity Developed |
|---|---|
| None | 0.5 |
| Human Milk (skimmed): | |
| 0.02 milliliter | 2.2 |
| 0.06 milliliter | 7.0 |
| 0.02 milliliter | 12.4 |
| N-acetyl-d-glucosamine: | |
| 0.9 milligram | 2.3 |
| 3.0 milligrams | 7.8 |
| 9.0 milligrams | 9.2 |

*Table E.—Yeast extract*

| Supplement | Milliliters of N/10 NaOH Solution Needed to Neutralize Acidity Developed |
|---|---|
| None | 0.7 |
| Human milk (skimmed): | |
| 0.02 milliliter | 3.7 |
| 0.2 milliliter | 13.0 |
| Yeast Extract: | |
| 100 milligrams | 2.6 |
| 300 milligrams | 4.8 |

*Table F.—Ovomucin solution*

| Supplement | Milliliters of N/10 NaOH Solution Needed to Neutralize Acidity Developed |
|---|---|
| None | 0.9 |
| Human Milk (skimmed): | |
| 0.02 milliliter | 2.7 |
| 0.2 milliliter | 12.8 |
| Ovomucin solution: | |
| 0.1 milliliter | 0.8 |
| 0.3 milliliter | 0.9 |
| 1.0 milliliter | 1.0 |

The results of these tests, which are typical of many which I have carried out in accordance with my testing procedure described above, show that hog gastric mucin, N-acetyl-d-glucosamine and yeast extract are all sources of the *Lactobacillus bifidus* growth-promoting factor, the two former being somewhat more active than yeast extract. The test results also show that neither tomato juice nor ovomucin constitutes a source material for the growth-promoting factor.

It may also be remarked that the extent of growth of the microorganism *Lactobacillus bifidus* var. Penn given when 0.06 milliliter of skimmed human milk of average growth-promoting factor content is present as a supplement in the basal medium is taken as 1 unit, the amount of growth-promoting factor present in 0.06 milliliter of skimmed human milk being termed 1 unit, or 1 György unit, in the quantitative measure of amounts of this factor. Milk of average growth-promoting factor content is specified, as the content of the factor in breast milk varies slightly, to some extent, depending on the person supplying the milk and other biological controlling factors.

Throughout the specification and claims the term subtance is intended to have a general meaning, including both products having nutritional value, as well as those which cannot be used for infant feeding. It includes not only organic but also inorganic materials, as well as biologically-produced products, and those which are of natural origin.

The term "incubating" is utilized in its ordinary sense in bacteriology, meaning maintaining an inoculated medium under conditions such as would normally result in growth and proliferation of the microorganism, assuming the presence of all necessary nutrients for the microorganism in the medium.

Since various changes and modifications may be made in my improved procedure, as herein disclosed, without departing from the spirit of my invention, it is intended that these variations, to the extent that they are within the scope of the appended claims, shall be regarded as part of my invention.

I claim:

1. The method of determining whether a substance contains the *Lactobacillus bifidus* growth-promoting factor comprising substances of the group of N-glycosides containing N-acetyl-hexosamines in glycosidic linkage which comprises adding a small amount of the substance to be tested to a medium for *Lactobacillus bifidus* growth which is sufficient in all nutrients needed for the strain *Lactobacillus bifidus* var. Penn to grow thereon except said growth-promoting factor, said medium containing sufficient lactose to supply the carbohydrate requirement of said *Lactobacillus bifidus* var. Penn, inoculating said medium containing said added substance with *Lactobacillus bifidus* var. Penn, and incubating said inoculated medium under microaerophilic conditions.

2. The method of determining whether a substance contains the *Lactobacillus bifidus* growth-promoting factor comprising substances of the group of N-glycosides containing N-acetyl-hexosamines in glycosidic linkage which comprises adding a small amount of the substance to be tested to a medium for *Lactobacillus bifidus* growth containing amino acids, sugar, vitamins and vitamin precursors, and minerals, said medium being sufficient in all nutrients needed for the strain *Lactobacillus bifidus* var. Penn to grow thereon except said growth-promoting factor, said medium containing sufficient lactose to supply the carbohydrate requirement of said *Lactobacillus bifidus* var. Penn, inoculating said medium containing said added substance with *Lactobacillus bifidus* var. Penn, and incubating said inoculated medium under microaerophilic conditions.

3. The method of determining whether a substance contains the *Lactobacillus bifidus* growth-promoting factor comprising substances of the group of N-glycosides containing N-acetyl-hexosamines in glycosidic linkage which comprises adding a small amount of the substance to be tested to a medium for *Lactobacillus bifidus* growth which contains: dipotassium phosphate; lactose; sodium acetate; hylrolyzed casein; adenine; guanine; uracil; xanthine; alanine; cystine; tryptophane; asparagine; vitamins and vitamin precursors; and mineral salts, said medium being sufficient in all nutrients needed for the *Lactobacillus bifidus* var. Penn strain to grow thereon except said *Lactobacillus bifidus* growth-promoting factor, said lactose content thereof being sufficient to supply the carbohydrate requirement of said *Lactobacillus bifidus* var. Penn strain, inoculating said medium containing said added substance with *Lactobacillus bifidus* var. Penn, and incubating said inoculated medium under microaerophilic conditions.

4. The method of determining whether a substance contains the *Lactobacillus bifidus* growth-promoting factor comprising substances of the group of N-glycosides containing N-acetyl-hexosamines in glycosidic linkage which comprises adding a small amount of the substance to be tested to a medium for *Lactobacillus bifidus* growth containing, per liter of solution, the following constituents in substantially the amounts specified:

| Constituent | Unit | Amount |
|---|---|---|
| Casein hydrolysate (casein hydrolyzed by enzymatic action) | grams | 5 |
| Lactose | do | 35 |
| Sodium acetate (anhydrous) | do | 25 |
| Di-potassium phosphate | do | 5 |
| Alanine | milligrams | 200 |
| Cystine | do | 200 |
| Tryptophane | do | 200 |
| Asparagine | do | 100 |
| Adenine | do | 10 |
| Guanine | do | 10 |
| Xanthine | do | 10 |
| Uracil | do | 10 |
| Magnesium sulfate | do | 200 |
| Ferrous sulfate | do | 10 |
| Sodium chloride | do | 10 |
| Manganese sulfate | do | 7 |
| Thiamine hydrochloride | micrograms | 200 |
| Riboflavin | do | 200 |
| Calcium pantothenate | do | 400 |
| Pyridoxine hydrochloride | do | 1200 |
| Nicotinic acid | do | 600 |
| Para-aminobenzoic acid | do | 10 |
| Folic acid | do | 10 |
| Biotin | do | 4 |
| Ascorbic acid | grams | 1 | said medium being sufficient in all nutrients needed to support the growth of the strain *Lactobacillus bifidus* var. Penn except said *Lactobacillus bifidus* growth-promoting factor, inoculating said medium containing said added substance with *Lactobacillus bifidus* var. Penn, and incubating said inoculated medium under microaerophilic conditions.

References Cited in the file of this patent

UNITED STATES PATENTS 2,595,499   Wood _____ May 6, 1952

OTHER REFERENCES

Rosenthal et al.: Am. Jour. Infectious Diseases, February 1931, vol. 48, pages 226, 235.

Krueger et al.: Jour. Bact., vol. 55, No. 5, May 1948, pages 683–92.